United States Patent
Watanabe et al.

(10) Patent No.: US 11,157,550 B2
(45) Date of Patent: Oct. 26, 2021

(54) IMAGE SEARCH BASED ON FEATURE VALUES

(71) Applicant: Hitachi, Ltd., Tokyo (JP)

(72) Inventors: Yuki Watanabe, Tokyo (JP); Atsushi Hiroike, Tokyo (JP)

(73) Assignee: HITACHI, LTD., Tokyo (JP)

( * ) Notice: Subject to any disclaimer, the term of this patent is extended or adjusted under 35 U.S.C. 154(b) by 328 days.

(21) Appl. No.: 15/025,977

(22) PCT Filed: Oct. 2, 2013

(86) PCT No.: PCT/JP2013/076761
§ 371 (c)(1),
(2) Date: Mar. 30, 2016

(87) PCT Pub. No.: WO2015/049732
PCT Pub. Date: Apr. 9, 2015

(65) Prior Publication Data
US 2016/0217158 A1    Jul. 28, 2016

(51) Int. Cl.
| | |
|---|---|
| *G06F 16/583* | (2019.01) |
| *G06F 16/51* | (2019.01) |
| *G06F 16/248* | (2019.01) |
| *G06F 16/58* | (2019.01) |
| *G06F 16/532* | (2019.01) |

(52) U.S. Cl.
CPC ........ *G06F 16/5838* (2019.01); *G06F 16/248* (2019.01); *G06F 16/51* (2019.01); *G06F 16/532* (2019.01); *G06F 16/5866* (2019.01)

(58) Field of Classification Search
CPC ......... G06F 17/30256; G06F 17/30268; G06F 16/58; G06F 16/5838; G06F 16/51; G06F 16/5866; G06F 16/532; G06F 16/248

USPC ......................................................... 707/722
See application file for complete search history.

(56) References Cited

U.S. PATENT DOCUMENTS

| | | | |
|---|---|---|---|
| 6,181,818 B1 * | 1/2001 | Sato ........................ | G06F 16/56 382/170 |
| 6,907,141 B1 * | 6/2005 | Okamoto ............. | G06K 9/4652 382/225 |

(Continued)

FOREIGN PATENT DOCUMENTS

| | | |
|---|---|---|
| JP | 2004-341940 A | 12/2004 |
| JP | 2005-352782 A | 12/2005 |

(Continued)

OTHER PUBLICATIONS

International Search Report of PCT/JP2013/076761 dated Jan. 7, 2014.

*Primary Examiner* — Ashish Thomas
*Assistant Examiner* — Nargis Sultana
(74) *Attorney, Agent, or Firm* — Mattingly & Malur, PC

(57) ABSTRACT

An image search device stores images and tag information about the images, receives an image, extracts, from the image, feature values for search queries a similar image search unit which performs a similar-image search to obtain similar images and grouping information, divides the queries into groups in accordance with the obtained grouping information, calculates the levels of importance of the groups, sorts the search results in accordance with the levels of importance of the groups, and outputs information about the search results for each group.

3 Claims, 16 Drawing Sheets

(56) References Cited

U.S. PATENT DOCUMENTS

| | | | |
|---|---|---|---|
| 2002/0097914 A1* | 7/2002 | Yaung | G06F 16/5838 382/225 |
| 2002/0168117 A1* | 11/2002 | Lee | G06F 16/5838 382/305 |
| 2002/0181783 A1* | 12/2002 | Shiiyama | G06F 16/583 382/217 |
| 2004/0267443 A1* | 12/2004 | Watanabe | G01C 21/36 701/533 |
| 2005/0278379 A1* | 12/2005 | Nakazawa | G06F 16/58 |
| 2006/0195475 A1* | 8/2006 | Logan | G06F 16/58 |
| 2008/0118151 A1* | 5/2008 | Bouguet | G06F 16/5838 382/181 |
| 2009/0060294 A1* | 3/2009 | Matsubara | G06K 9/00496 382/118 |
| 2009/0077089 A1* | 3/2009 | Safo | G06F 16/38 |
| 2010/0174707 A1* | 7/2010 | Kudo | G06K 9/46 707/723 |
| 2011/0052069 A1* | 3/2011 | Nakabayashi | G11B 27/105 382/190 |
| 2011/0103699 A1* | 5/2011 | Ke | G06K 9/6202 382/209 |
| 2011/0176737 A1* | 7/2011 | Mass | G06F 16/58 382/220 |
| 2011/0282867 A1* | 11/2011 | Palermiti, II | G06F 16/5866 707/722 |
| 2011/0305399 A1* | 12/2011 | Zitnick | G06F 16/5838 382/225 |
| 2011/0307425 A1* | 12/2011 | Wang | G06F 16/583 706/12 |
| 2011/0314031 A1* | 12/2011 | Chittar | G06F 16/5838 707/749 |
| 2012/0059818 A1* | 3/2012 | Phang | G06F 16/58 707/722 |
| 2012/0170847 A1* | 7/2012 | Tsukidate | G06F 16/583 382/190 |
| 2014/0136566 A1* | 5/2014 | Kim | G06F 16/51 707/769 |
| 2014/0188926 A1* | 7/2014 | Chandel | G06F 16/435 707/767 |
| 2014/0222755 A1* | 8/2014 | Soderberg | G06F 16/48 707/609 |
| 2014/0372951 A1* | 12/2014 | Li | G06F 16/583 715/835 |
| 2015/0066957 A1* | 3/2015 | Cevahir | G06F 16/583 707/749 |
| 2015/0112970 A1* | 4/2015 | Hirai | G06T 7/70 707/722 |
| 2016/0005171 A1* | 1/2016 | Watanabe | G06K 9/00677 382/118 |
| 2016/0098426 A1* | 4/2016 | Sayko | G06F 16/951 707/770 |

FOREIGN PATENT DOCUMENTS

| | | |
|---|---|---|
| JP | 2008-242965 A | 10/2008 |
| JP | 2010-271769 A | 12/2010 |
| JP | 2011-048668 A | 3/2011 |

* cited by examiner

FIG. 2
IMAGE DATABASE STRUCTURE
| IMAGE ID (201) | IMAGE DATA (202) | IMAGE FEATURE VALUE (203) | TAG (204) |
|---|---|---|---|
| 1 |  | [50, 97, 186, 36, 55, 64, 173, 34, ...] | Alice |
| 2 |  | [119, 115, 130, 143, 65, 13, 212, 73, ...] | Bob |
| 3 |  | [89, 114, 232, 158, 166, 207, 230, 244, ...] | Carol |
| 4 |  | [54, 110, 190, 20, 65, 55, 178, 39, ...] | Alice |
| 5 |  | [91, 121, 221, 175, 154, 202, 228, 243, ...] | Carol |
| 6 |  | [119, 165, 136, 189, 140, 148, 165, 204, ...] | Alice |
| 7 |  | [120, 95, 47, 29, 80, 152, 196, 105, ...] | Alice |
| ... | ... | ... | ... |

(a)  (b)

HIGH-SPEED SEARCH BY CLUSTERING (a)   (b)

FIG. 14
ILLUSTRATION SHOWING PARTIAL SIMILAR IMAGE SEARCH
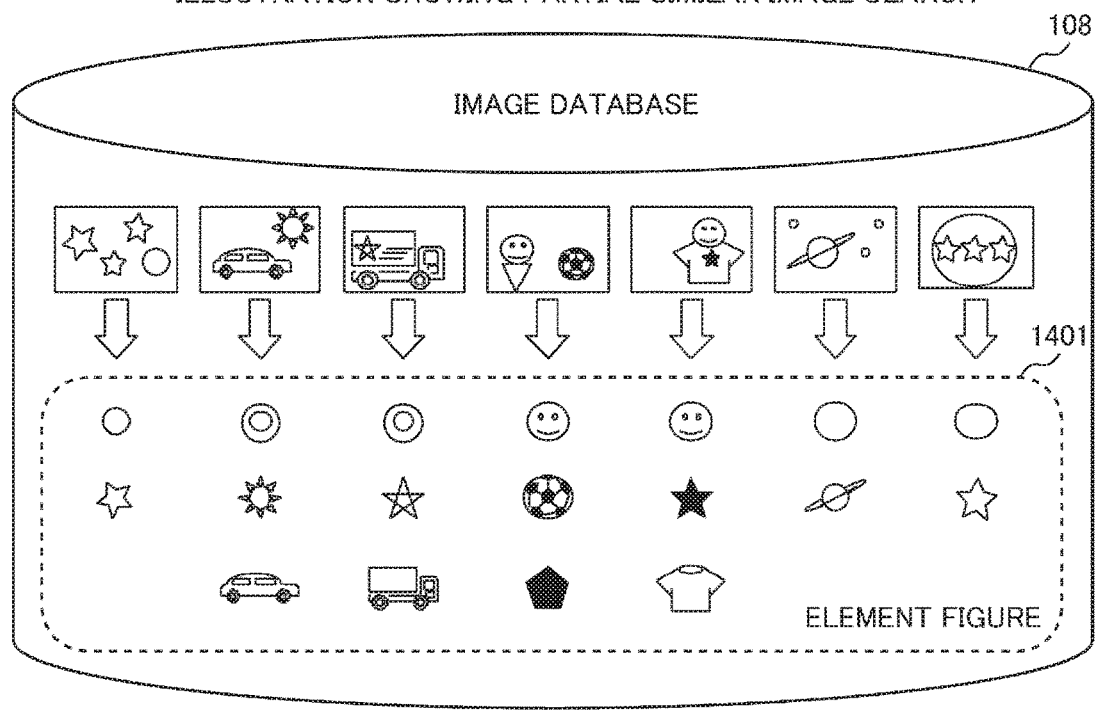
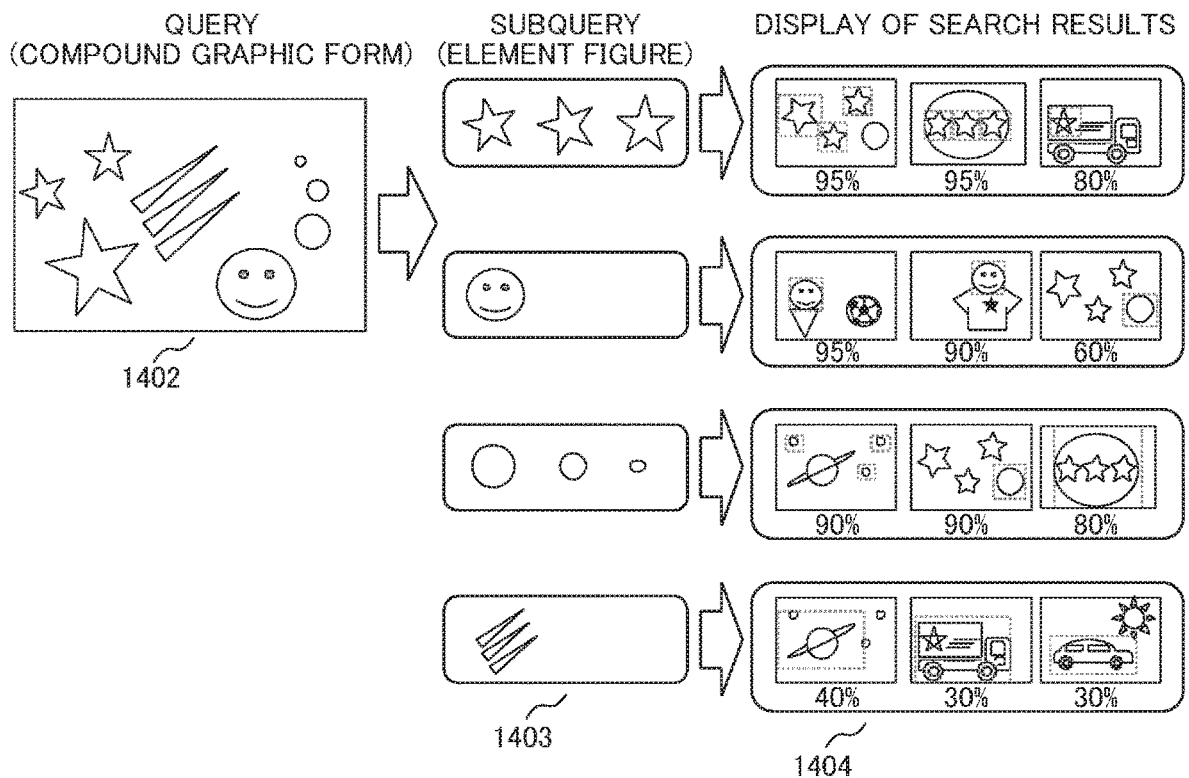

IMAGE SEARCH BASED ON FEATURE VALUES

TECHNICAL FIELD

The present invention relates to similar image search technique.

BACKGROUND ART

According to the development of an IT infrastructure, mass multimedia data (documents, images, voice, various log data, and the like) have been stored in a large capacity storage. To efficiently extract information from the stored mass data, various information extraction/search techniques have been devised as to individual medium data and have been put into practice.

For an example of extracting information from an image, an image recognition technique for recognizing an object in the image and outputting its name is studied. In such image recognition technique, a tag for an input image is estimated by preparing a "dictionary" in which images and tags that describe the images are registered in large quantities beforehand and searching with those of which image in the dictionary features of the newly input image are matched. Further, a method of applying machine learning to images and tags in the dictionary as learning data and estimating a tag using a generated discrimination circuit without collating with all images in the dictionary is also used. In both methods, a large number of pairs of an image and a tag need to be prepared and manual work is produced. As manpower costs for making the dictionary increase when objects of recognition increase, an efficient method of making a dictionary is demanded.

For a technique close to the image recognition technique, a similar image search technique is known. The similar image search means technique for searching images close to a given image in features from a database, rearranging the images in the order of similarity and outputting them. If similar faces can be collectively tagged in making a dictionary for image recognition, the dictionary can be made efficiently. Further, various images can be obtained at a time by performing a similar image search using plural tagged images for a query and work efficiency can be further enhanced. In the meantime, when an unsuitable image for a similar image is included in a query group, possibility that noise is included in a search result increases and there is a risk of decreased work efficiency. Therefore, technique for enhancing the quality of a query group is demanded.

For a method of feeding back search results to multiple queries, it is disclosed in Patent Literature 1 to extract plural shots from an input dynamic image and to search the dynamic image using feature values hereby extracted for a query. When a user evaluates the search result, selects only shots having high similarity included in a suitable dynamic image and adds features of the selected shots to features in a search query, features in a search query are updated. As a result, a false search based upon unnecessary shots can be reduced.

CITATION LIST

Patent Literature

PTL 1: Japanese Patent Application Laid-Open No. 2008-242965

SUMMARY OF INVENTION

Technical Problem

Since Patent Literature 1 has it as its object to finally obtain search results having high similarity in units of dynamic image though a search using plural shots is made inside, Patent Literature 1 is not suitable for an object of collecting a variety of images like a purpose of making a dictionary. Further, evaluation by a user is required to determine an importance level of a query and it does not make work of the user efficient.

The present invention is made in view of the abovementioned problem and its object is to provide image search technique by which a high-precision similar image search using multiple queries can be made. Further, the object is to provide a method of feeding back search results to a query group.

Solution to Problem

To settle the abovementioned problem, the configurations disclosed in a scope of claims for example are adopted. The present invention includes plural means for settling the problem, however, for one example, an image search system has a characteristic that the image search system is provided with a storage unit in which image feature values for a search extracted from an image to be searched are accumulated, an input unit to which plural images are input as query images, an extraction unit that extracts image feature values from the query images, a search unit that searches the storage unit for the image feature values for a search using the image feature values, a display device that displays, as a search result, an original image from which the image feature values for a search similar to the image feature values are extracted, and a determination unit that determines an importance level of the query image on the basis of the search result.

The present invention is further that an image search method has a characteristic that the image search method is provided with a storing step of accumulating image feature values for a search extracted from an image to be searched, an input step of inputting a plurality of images as query images, an extraction step of extracting image feature values from the query image, a search step of searching the stored image feature values for a search using the image feature values, a display step of displaying, as a search result, the original image from which the image feature values for a search similar to the image feature values are extracted, and determining an importance level of the query image on the basis of the search result.

Advantageous Effects of Invention

According to the image search system disclosed in the present invention, a subject, configurations and effect except that, as mentioned above, input multiple queries are grouped and similar image search results can be obtained for each group rearranged according to an importance level will be clarified by the description of the following embodiments.

BRIEF DESCRIPTION OF DRAWINGS

FIG. 2 Illustration for the configuration of an image database 108 and a data example.

FIG. 14 Illustration for a partial similar image search using an image search device 105.

DESCRIPTION OF EMBODIMENTS

First Embodiment

System Configuration

Figure 1:
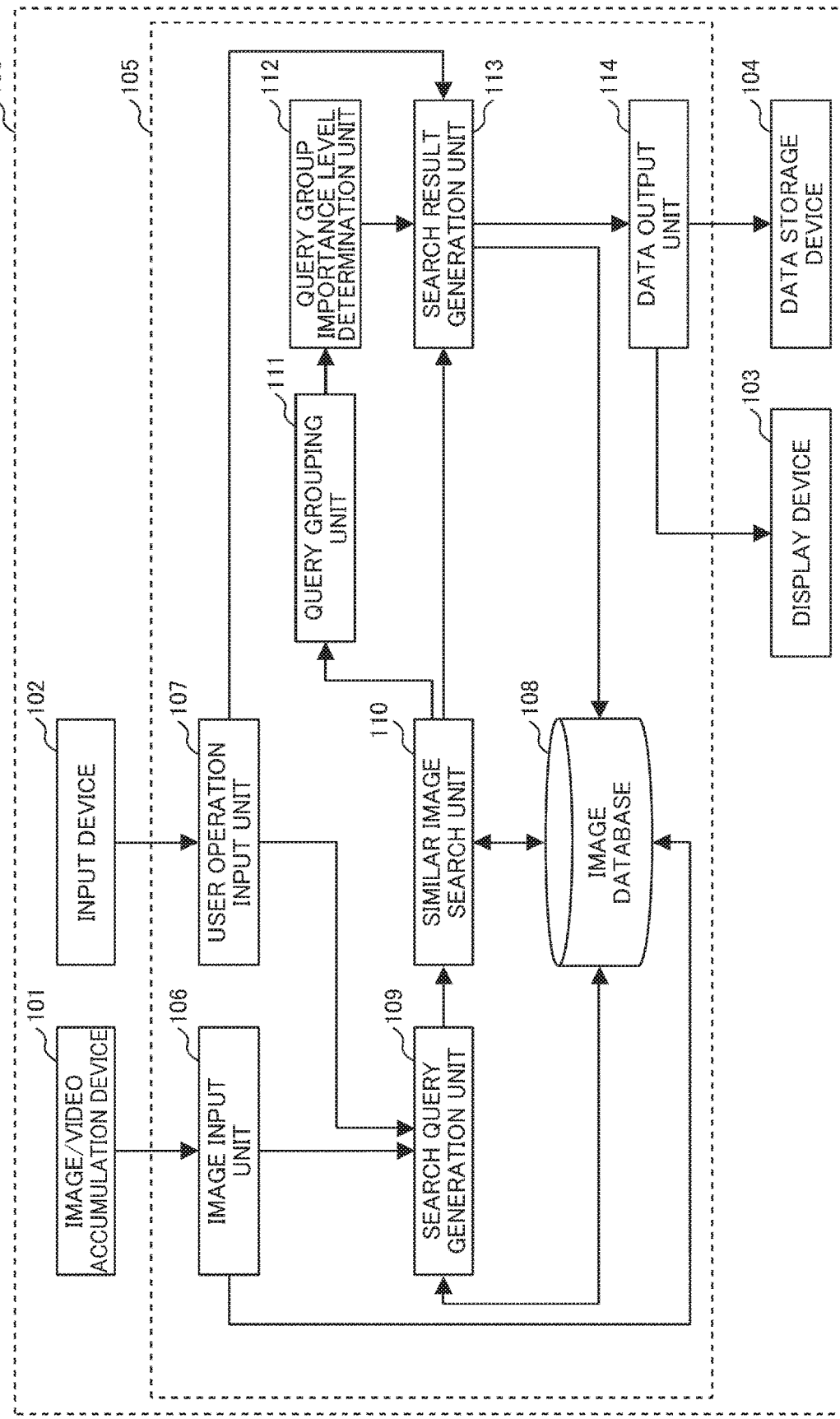
FIG. 1 A block diagram showing an image search system 100 equivalent to a first embodiment.

FIG. 1 is a block diagram showing an image search system 100 equivalent to a first embodiment of the present invention. The image search system 100 has it as an object to enhance the quality of search queries by grouping queries for plural query images input by a user and putting search results for each group together.

The image search system 100 is provided with an image/video accumulation device 101, an input device 102, a display device 103, a data storage device 104 and an image search device 105. Further, though not shown in FIG. 1, a camera may also be provided so as to enable directly inputting a photographed image.

The image/video accumulation device 101 is a storage medium for storing image data and video (dynamic image) data and can be configured using a storage system connected via a network such as a hard disk drive built in a computer, an NAS (Network Attached Storage) and an SAN (Storage Area Network). Further, the image/video accumulation device may also be a cache memory that temporarily holds video data continuously input from a camera, for example.

The input device 102 is an input interface such as a mouse, a keyboard and a touch-sensitive device for transmitting the operation of a user to the image search device 105. The display device 103 is an output interface such as a liquid crystal display and is used for the display of a search result by the image search device 105, interactive operation with a user and the like. The data storage device 104 stores a search result by the image search device 105 and is used for utilizing the search result in a high order application. The search result may also be image data obtained by a search and may also be a tag attached to image data.

The image search device 105 makes a similar image search using input plural query images, groups queries according to data distribution information obtained in a search process, determines importance levels of the groups, rearranges the groups according to the importance level, and outputs a search result for each group. Image data may also be directly input as a search query and an image that corresponds to a specified condition may also be obtained from a database to use the image for a query. Further, the image search device has a function for specifying a group of queries to be a cause of an undesirable search result on the basis of relation between grouped search results and a search query and excluding the corresponding query from search queries. Although the number of queries has only to be one or more, in a situation where a few tens to a few hundreds of queries are input and it is difficult for users to confirm all the queries, the present invention is effective. The image search device 105 is provided with an image input unit 106, a user operation input unit 107, an image database 108, a search query generation unit 109, a similar image search unit 110, a query grouping unit 111, a query group importance level determination unit 112, a search result generation unit 113 and a data output unit 114.

The image input unit 106 reads image/video data from the image/video accumulation device 101 and converts to a data format used inside the image search device 105. At this time, the video data is decomposed into plural frames. The read data is transmitted to the image database 108 when a user registers the data in the image database 105 and is transmitted to the search query generation unit 109 when search processing is executed.

The user operation input unit 107 detects the operation of the input device 102 by a user, transmits its signal to the search query generation unit 109 or the search result generation unit 113, controls the execution of processing in each unit, and changes a parameter used for the processing.

The image database 108 means a database that stores image data, its feature value and a tag. The feature value means data required for a search based upon apparent similarity of an image. The tag in this case means data used for narrowing down images on a specified condition. For example, a name of a person in an image, a photographed date and the classification of scenes (indoor/outdoor, daytime/nighttime and the like) can be given. If necessary, one image may also have plural tags. Access to the image database 108 occurs in registering data from the image input unit 106, in a search from the search query generation unit 109 and the similar image search unit 110 and in updating data from the search result generation unit 113. The structure of the image database 108 will be detailedly described later in relation to FIG. 2.

The search query generation unit 109 generates image feature values required for the similar image search. The image feature value means numeric information representing apparent features of an image and is expressed by a fixed-length vector. Detailedly, the image feature value will be described later in relation to FIG. 3. When one or more images are input to the image search device 105, image feature values of each image are calculated. When a tag is input, feature values of an image to which the corresponding tag is attached are read from the image database 108. The plural feature values generated above are transmitted to the similar image search unit 110 as search queries.

The similar image search unit 110 respectively searches a similar vector for the transmitted plural feature values from the image database 108. Similarity between vectors is defined as the shorter Euclidean distance between vectors is, the higher similarity is for example. A search of a similar vector can be accelerated by classifying data beforehand. The details will be described later in relation to FIGS. 4 and 5. Similar images for each query, similarity between them and classification information used for the search are output from the similar image search unit 110. Until the whole processing is finished in the image search device 105, relation between the query and a search result shall be held.

The query grouping unit 111 groups queries or a query group into plural groups on the basis of the classification information output from the similar image search unit 110. As a result, queries images of which have apparently close features, that is, values of vectors that are image feature values of which are close are grouped into the same group. When the number of members in each group does not meet a predetermined number, similar groups may also be integrated.

The query group importance level determination unit 112 calculates an importance level of a group. For a method of calculating the importance level, it is conceivable that the number of queries which belong to the group and the similarity of images in a search result for example are used; however, a concrete calculation method is different depending upon an application.

The search result generation unit 113 rearranges groups in order in an importance level, rearranges search results in the group in the order of similarity, and outputs search results for each group. Output data may also be similar images themselves and may also be score data for each tag obtained by totaling tags added to the similar images. The search result generation unit 113 collectively tags similar images that belong to the group according to an instruction of a user and can add the tags to the corresponding images in the image database 108. Further, when a user judges that a query which belongs to a group is unsuitable for a search, the tag can be deleted from the corresponding image in the image database 108. As a result, in the following search processing, the unsuitable query is not used in the search query generation unit 109.

The data output unit 114 shapes/converts the query, group information and the search result respectively obtained in the abovementioned processing if necessary and outputs them to the display device 103 and the data storage device 104.

FIG. 2 shows the configuration of the image database 108 and data examples. FIG. 2 shows an example of the configuration in a table format, though a data format may be arbitrary.

The image database 108 is provided with an image table 200 including an image ID field 201, an image data field 202, an image feature value field 203 and a tag field 204.

The image ID field 201 holds identification numbers of each image data piece. The image data field 202 is a field in which image data is held in a binary form and is used when a user confirms a search result. The image feature value field 203 holds image feature value data. An image feature value means fixed-length numerical vector data obtained by digitizing features such as color and a shape which an image itself has. Plural image feature value fields are prepared, and a shape feature value and a color feature value for example may also be managed in separate fields. The tag field 204 holds numerical data for searching a condition and character string data. In the example shown in FIG. 2, images of faces are written in the image data field 202 and character strings of personal names are written in the tag field 204. In the image data field 202, however, an arbitrary image such as a landscape picture, a picture of an article, an illustration and a drawing can be registered and in the tag field 204, arbitrary data such as a scene name, a photographed date, an article name and attribute information can be registered. Further, plural tags may also be registered for one registered image.

<Operation of Each Unit>

The overall configuration of the image search system 100 has been described. After an operational principle of the image search system 100 is outlined, the detailed operation of each functional unit will be described below.
(Description of Similar Image Search)

Figure 3:
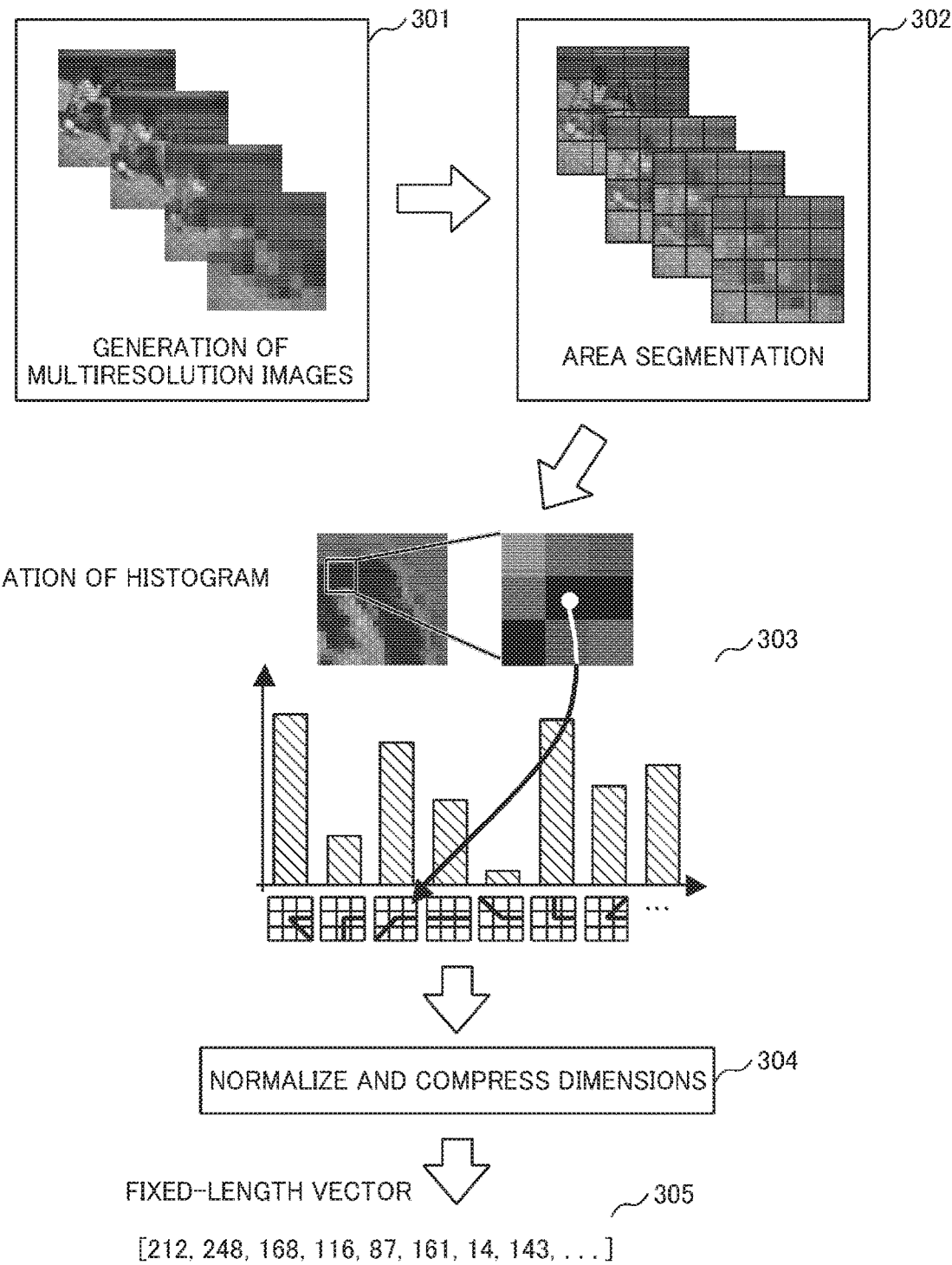
FIG. 3 Illustration for processing for extracting image feature values in a search query generation unit 109.

FIG. 3 shows one example of a procedure for extracting an image feature value used in the image search system 100. In this process, plural-resolution images are first generated from an input image. Next, the image of each resolution is segmented into areas. A histogram is formed by totaling the number of characteristic edge patterns included in each area and is utilized for multidimensional vectors. Normalization for correcting bias of distribution for each pattern is made and the histogram is stored as fixed-length vector data of approximately several hundreds of dimensions which the system can readily handle and which is obtained by compressing dimensions of obtained vectors of several thousands of dimensions by principal component analysis and the like. As the vector data obtained as described above has close values between seemingly similar images, it can be used for the similar image search. For vector data representing apparent features of an image, another feature value such as edge histogram features defined as generally well-known MPEG-7 may also be used.

The similar image search means processing for searching similar data by evaluating similarity between vectors showing image feature values. Dissimilarity d between two n-dimensional vectors X, Y can be calculated by the square of Euclidean distance as shown in a mathematical expression 1 for example. Xi and Yi denote the "i"th element of the vector X and the vector Y.

[Mathematical expression 1]

[Mathematical expression 1]

$$d = \sum_{i}^{n} (X_i - Y_i)^2 \qquad \text{Mathematical expression 1}$$

To obtain a similar image, dissimilarity between all the images in the database and feature values of a query image is basically calculated using the mathematical expression 1, all the images are sorted in the order of smaller dissimilarity, and the similar image has only to be output. However, since processing time linearly increases according to a data amount, it is difficult to search in a large-scale database. Then, clustering processing in which a group including similar data is generated beforehand is made beforehand. For a method of clustering, k-means clustering for example is known. The k-means clustering is a method of automatically dividing into K clusters to which a data set is given using a mean value of the cluster.

Figure 4:
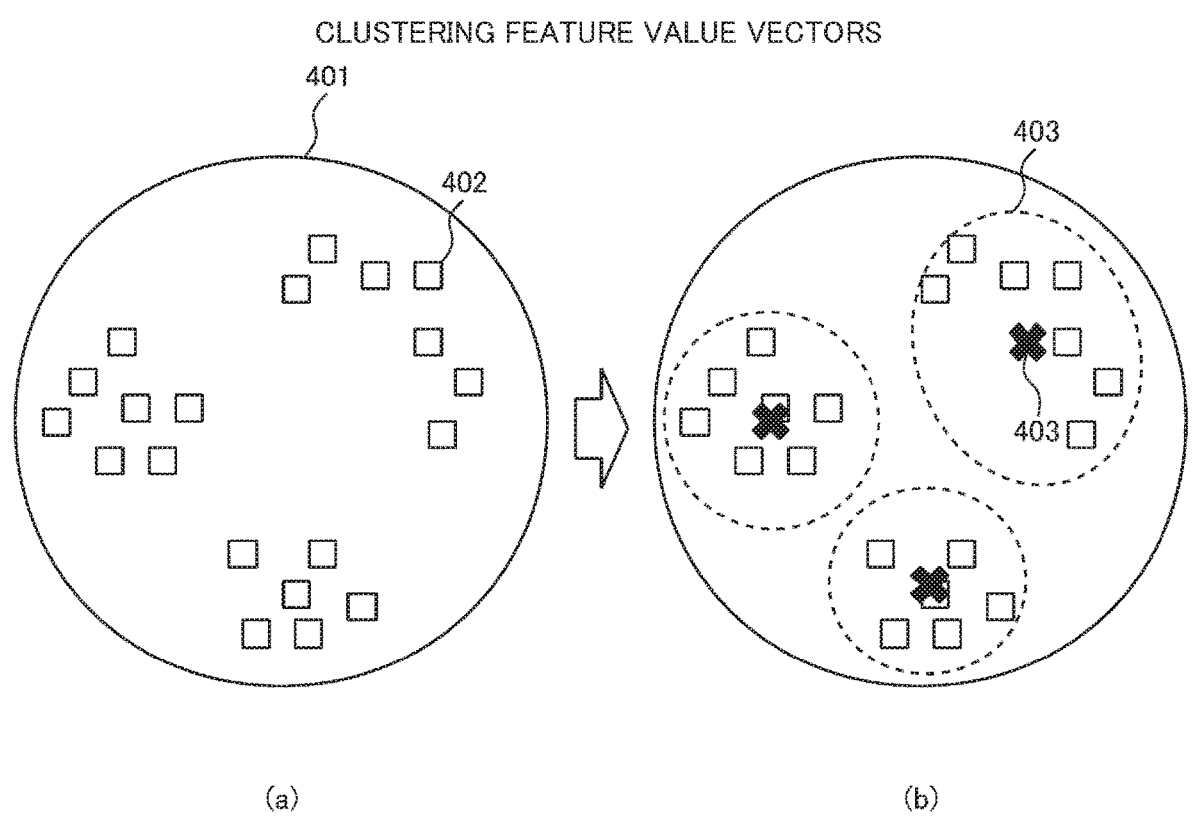
FIG. 4 Illustration for clustering for a similar image search in a similar image search unit 110.

FIG. 4 illustrates clustering of data. 401 in FIG. 4(*a*) denotes feature value space and feature value vectors 402 registered in the database are mapped. When clustering processing is performed, a cluster 403 is formed with feature values close in distance between the vectors as shown in FIG. 4(*b*). In the image database 108, information of the cluster is managed by a pointer to feature values that belong to the cluster and a mean value vector 403 of all feature values that belong to the cluster. Further, an identification number is given to each cluster.

Figure 5:
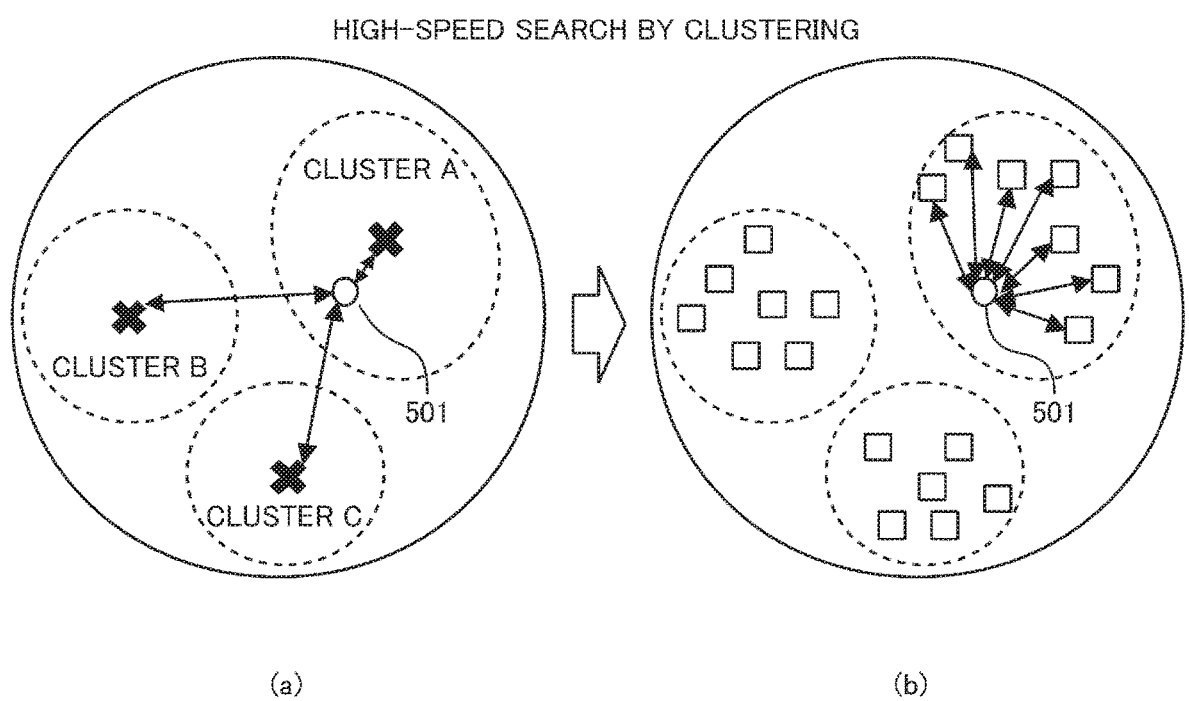
FIG. 5 Illustration for a similar vector search using clustering in the similar image search unit 110.

FIG. 5 illustrates a search using clustering. In a search, distance between a query 501 and a mean vector of a cluster is first calculated as shown in FIG. 5(*a*) and one or more clusters close in distance (close clusters) are selected. In the example shown in FIG. 5, a cluster A is selected. Next, distance between each feature value that belongs to the selected close cluster and the query 501 is calculated, distances are rearranged in close order, and an image upon which these feature values are based is output as a similar image. The similar image search for a large-scale database can be accelerated using the database to which clustering is already applied. For example, processing for searching high order 1000 similar images from an image database including four million items using feature values of 200 dimensions can be executed in approximately 10 milliseconds even if a general PC server is used.

According to the abovementioned procedure, the similar image search can be realized on the basis of feature value representation of the fixed-length vector representing apparent features of an image even if any feature value is used. However, feature values of a database image and a query image are required to be extracted according to the same algorithm.

Figure 6:
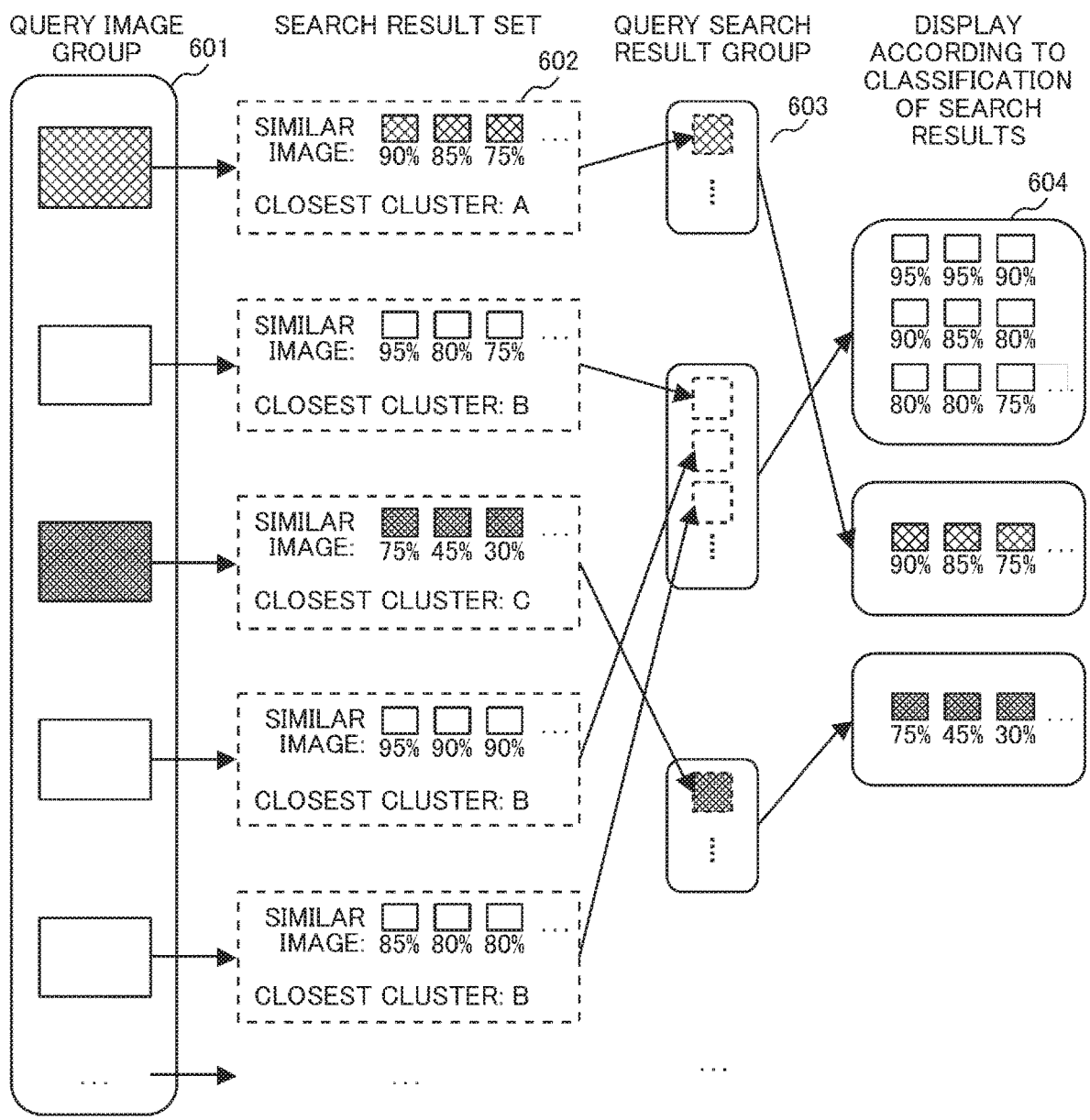
FIG. 6 Illustration for processing in which an image search device 105 groups queries using a result of the similar image search.

FIG. 6 illustrates processing for grouping plural queries and rearranging them according to an importance level of groups by the image search device 105.

First, when plural query images 601 are input, image feature values are calculated from each image and similar image search results 602 are obtained from the image database 108. The search result 602 includes similar images, their similarity and an identification number of the closest cluster selected in a search using clustering. The similarity s has a larger value as distance in feature value space becomes short. For example, when a mathematical expression 2 is calculated, the similarity s is a real value between 0 and 1 and it can be interpreted that the larger "s" is, the query image and the similar image resemble. In this case, "e" denotes a base of a natural logarithm. In display for a user, a value obtained by multiplying "s" by 100 may also be displayed in a state in which a percent is added to the value as shown in FIG. 6.

[Mathematical expression 2]

[Mathematical expression 2]

$$s = e^{-d} \qquad \text{Mathematical expression 2}$$

Next, pairs of a query and a search result are grouped. In the example shown in FIG. 6, pairs each of which has common closest cluster numbers are aggregated in the same group 603. For one example of grouping means in FIG. 6, a method of using information of a cluster is shown. However, if queries can be grouped in any viewpoint, this method can be applied. For example, queries having common tag information added to similar images may also be grouped.

After all queries are grouped, an importance level of the group is calculated and the groups are rearranged according to the importance level. The importance level is calculated using the number of queries that belong to the group and the number of similar images having a high importance level for example.

Finally, similar images are extracted from a search result related to the group, for example, rearranged in the order of higher similarity, and output as the search result for each group.

Since similar images having closer features can be confirmed for each group together by the abovementioned processing, compared with a case where similar images for plural queries are collectively displayed, the quality of the search result is enhanced. Further, a query to be a cause of an undesirable search result can be readily found by holding the pair of the query and the search result. An example that such an unsuitable query is excluded from a query group will be described later as the explanation of FIG. 8.

Figure 7:
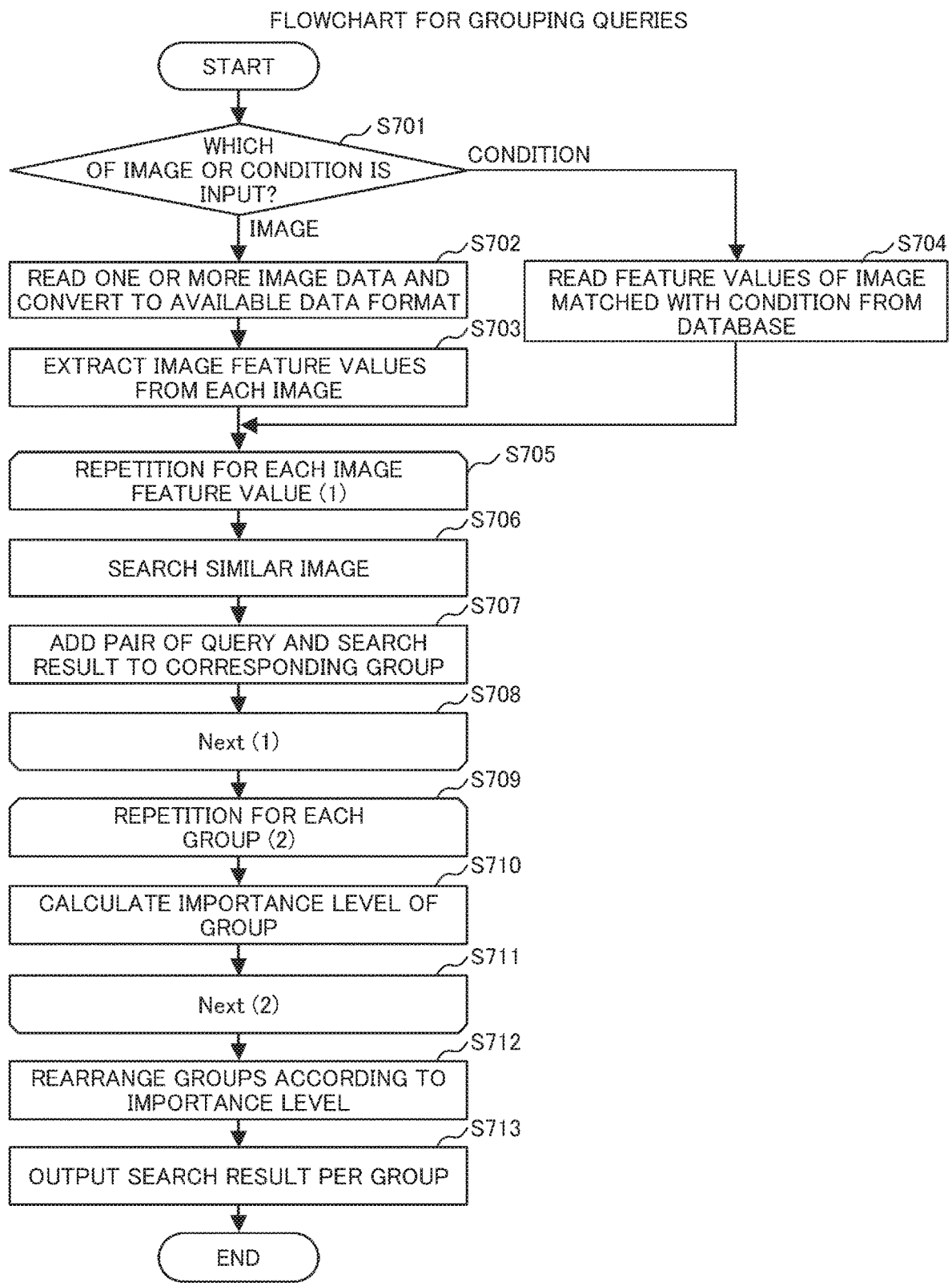
FIG. 7 A flowchart for explaining the processing in which the image search device 105 groups queries using the result of the similar image search.

FIG. 7 is a flowchart showing a procedure for a process that the image search device 105 groups plural queries, rearranges them according to an importance level of the group and outputs a search result. Each step shown in FIG. 7 will be described below.

(FIG. 7: Step S701)

Processing is branched depending upon a type of input to the image search device 105. When one or more images are input, the processing proceeds to a step S702 and in the case of a condition for a tag of an image, the processing proceeds to a step S704.

(FIG. 7: Step S702)

The image input unit 106 reads one or more image data from the image/video accumulation device 101 and converts to a data format available in the device. In the case of video data, a frame is extracted at a predetermined interval and the frame is managed as plural image data.

(FIG. 7: Step S703)

The search query generation unit 109 extracts image feature values from each image read in the step S702.

(FIG. 7: Step S704)

The search query generation unit 109 reads feature values of an image having a tag matched with a condition which is specified by a user and which is input from the user operation input unit 107 from the image database 108.

(FIG. 7: Steps S705 to S708)

The similar image search unit 110 and the query grouping unit 111 execute steps S705 and S706 for all feature values.

(FIG. 7: Step S706)

The similar image search unit 110 obtains similar images from the image database 108 using input feature values for a query. Further, the similar image search unit outputs the identification number of the closest cluster used in the search using clustering as a search result together.

(FIG. 7: Step S707)

The query grouping unit 111 distributes the pair of the query and the search result to the corresponding group according to the identification number of the closest cluster in the search result.

(FIG. 7: Steps S709 to S711)

The query group importance level determination unit 112 executes a step S710 for all groups generated in the step S707.

(FIG. 7: Step S710)

The query group importance level determination unit 112 calculates an importance level of the group according to the number of queries that belong to the group and similarity between similar images.

(FIG. 7: Step S712)

The search result generation unit 113 rearranges the groups according to the importance level.

(FIG. 7: Step S713)

The search result generation unit 113 rearranges similar images in the group in the order of similarity and generates a search result for each group. The data output unit 114 outputs this result to the external device and terminates this process flow. The data output unit may also display on the display device 103 according to an application and may also output to the data storage device 104.

Figure 8:
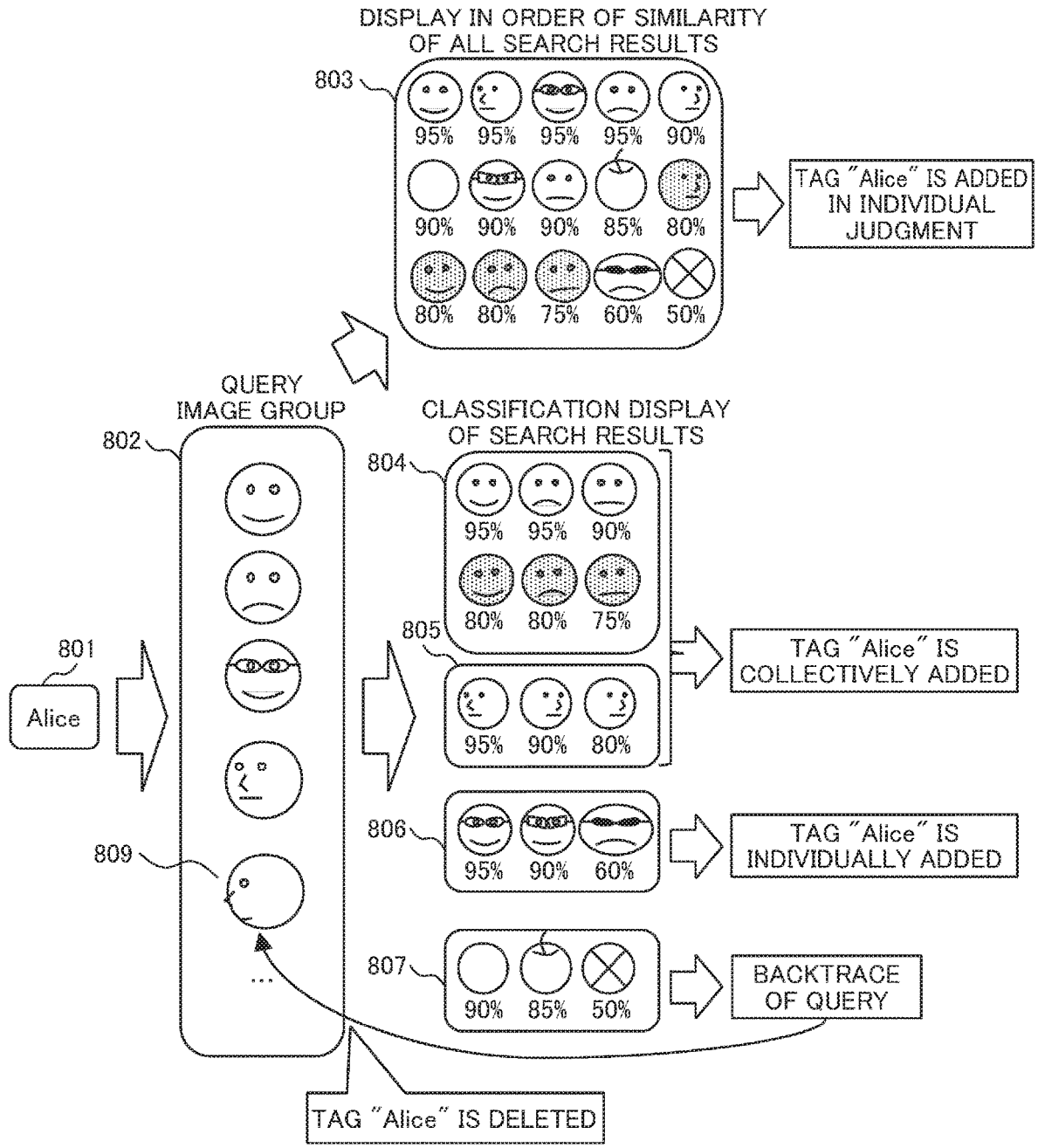
FIG. 8 Illustration for a situation in which the image search device 105 is applied to an image tagging tool and the image tagging tool feedbacks to a query group.

FIG. 8 shows an example in which the image search device 105 is applied to a face image tagging support tool and illustrates feedback of a search result to a query group. In this case, to facilitate explanation, a face image of a person is handled, as with a case where a tag is added to an article and a scene. As a name of the person and a tag are added to the face image, a search of the person by the input of his/her name and statistical analysis depending upon a frequency of the appearance of the person are enabled. However, it is difficult that a user determines the person for a large number of images and tags him/her.

To solve the problem, tagging work can be made efficient by collectively tagging similar faces obtained using the similar image search. At this time, a variety of faces can be obtained at a time by using plural face images 802 to which a tag corresponding to an input person's name 801 is added like 802 in FIG. 8 for a query. However, when all search results are displayed in the order of similarity like 803 in FIG. 8, it is likely that a tag is added to an unsuitable image in the search result by mistake in a case where noise is included in the query. Further, since face images having different features are displayed at random, it is difficult to confirm search results.

When the image search device 105 according to the present invention is used, search results having the similar features can be displayed in a state in which they are put together in a group for each query and visibility is enhanced. In the example shown in FIG. 8, since it can be confirmed that all search results include the specified person like search results 804, 805, a tag is collectively added to similar images in the groups. Since a different person is partially included as to a search result 806, a tag is individually added. The newly tagged images as described above are used for a query in the next or following search.

In a search result 807, no face image of the specified person is included and it is estimated that a query that causes this result is not suitable for a query for the similar image search. Since the image search device 105 manages the pair of the query and the search result with them correlated, the query can be conversely searched from the search result. As a result, a tag is excluded from an unsuitable query 809 that causes the search result 807 to be returned and the unsuitable query is not used for a query in the following work.

Figure 9:
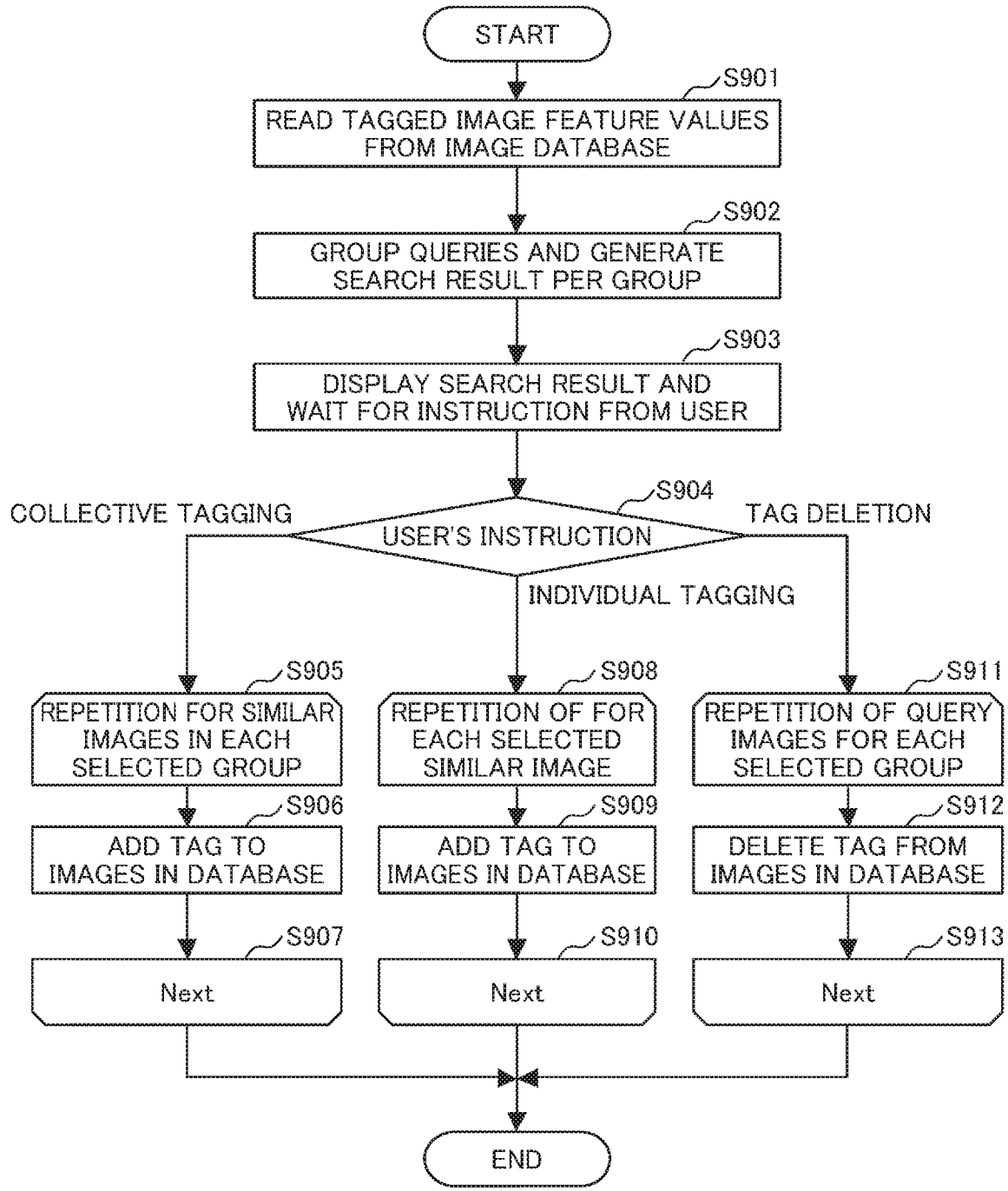
FIG. 9 A flowchart showing a procedure for feeding back to a query group in the image tagging tool to which the image search device 105 is applied.

Though not shown in FIG. 8, such display that the search results 804 to 807 and the queries which function as respective search keys are correlated may also be made. Hereby, visibility is further enhanced. FIG. 9 is a flowchart for explaining a process for tagging an image using the grouping of queries and a procedure for feedback processing of a search result to a query group. Each step of FIG. 9 will be described below.

(FIG. 9: Step S901)

Feature values of an image to which a tag input from the input unit 107 is added are read from the image database 108.

(FIG. 9: Step S902)

The image search device 105 outputs grouped queries and search results using one or more queries generated in the step S901. This processing is similar to that in S705 to S713 shown in FIG. 7.

(FIG. 9: Step S903)

The data output unit 114 displays the obtained search results on the display device 103. The user operation input unit waits until a user instructs the system using the input device 102.

(FIG. 9: Step S904)

The processing is branched depending upon contents of an instruction by the user. When search results in a group are collectively tagged, the processing proceeds to a step S905, when search results in the group are individually tagged, the processing proceeds to a step S908, and when a tag is deleted from the query in the group, the processing proceeds to a step S911.

(FIG. 9: Steps S905 to S907)

The search result generation unit 113 executes a step S906 for all similar images in the group selected by the user.

(FIG. 9: Step S906)

The tag used for a condition of the query in the step S901 is added to all the similar images in the group selected by the user and the tags are stored in the tag field 204 of the image database 108.

(FIG. 9: Steps S908 to S910)

The search result generation unit 113 executes a step S909 for all the similar images selected by the user and tags all the similar images.

(FIG. 9: Step S909)

The tag used for the condition of the query in the step S901 is added to all the similar images selected by the user and the tags are stored in the tag field 204 of the image database 108.

(FIG. 9: Steps S911 to S913)

The search result generation unit 113 executes a step S912 for query images in the group selected by the user.

(FIG. 9: Step S912)

The tag used for the condition of the query in the step S901 and added to the query image in the group selected by the user is deleted from the tag field 204 of the image database 108.

Figure 10:
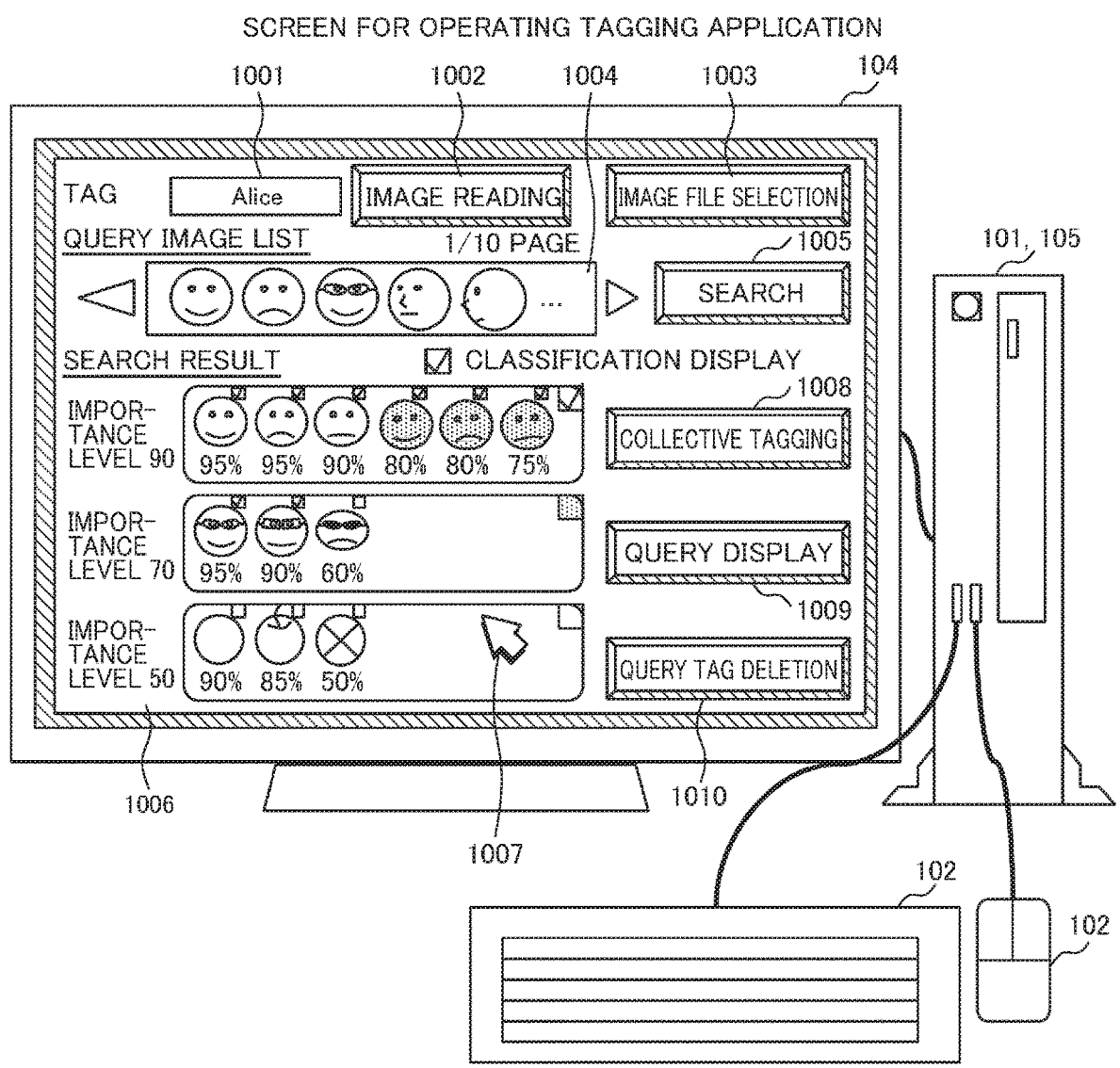
FIG. 10 Illustration for an example of the configuration of an operation screen of the image tagging tool to which the image search device 105 is applied.

FIG. 10 shows an operation screen used for tagging images using the grouping of queries. This screen can be provided on the display device 103. A user transmits operation information to the user operation input unit 107 by operating a cursor 1007 displayed on the screen using the input device 102.

The operation screen shown in FIG. 10 is provided with a tag input area 1001, an image reading button 1002, an image file selection button 1003, a query image display area 1004, a search button 1005, a search result display area 1006, a collectively tagging button 1008, a query display button 1009 and a query tag deletion button 1010.

A user first provides a set of search queries to the system. The method of providing queries includes a method of specifying a tag and a method of directly providing an image file. When a tag is specified, the user inputs a tag such as a person's name in the tag input area 1001. When the image reading button 1002 is clicked, images having the specified tag are read from images registered in the image database and are displayed in the query image display area 1004. When there are multiple queries, a page per predetermined number may also be displayed as shown on the screen.

When an image file is directly clicked, the user clicks the image file selection button 1003. For an input method, a dialog for specifying a file path of a file system for example may also be used and intuitional input operation by drag-and-drop may also be performed. Read images are displayed in the query display area 1004.

Next, when the user clicks the search button 1005, a similar image search is executed using a specified query group and similar images for each group are displayed in the search result display area 1006. The groups are rearranged and displayed according to an importance level. To enable the user to utilize for material of judgment for the following operation, numeric values of importance levels may also be displayed. Further, depending upon a request of a user, a frame of a group is removed and a check box (classification display in FIG. 10) for switching so that all similar images are displayed in a list may also be added.

The user confirms a search result and when similar images that belong to the group are all a face of the corresponding person, the user selects the group. For a selection method, a check box is prepared on the right upside of the group for example and has only to be clicked. When a face of another person is included in a part of the group, similar images are individually selected. In the same way as the selection of the group, a check box on the right upside of the similar images is clicked.

When the collectively tagging button 1008 is clicked after the similar images of the corresponding person are selected according to the abovementioned procedure, the tag specified in the tag input area 1001 is added to the similar images that belong to the selected group and the individually selected similar images and the tag field 204 of the image database 108 is updated.

Further, when the group including multiple undesirable results can be confirmed as a result of the search, only queries of the group can be displayed in the query image display area 1004 by selecting the group and clicking the query display button 1009. A tag of the unsuitable query can be deleted by clicking the query tag deletion button 1010.

Figure 11:
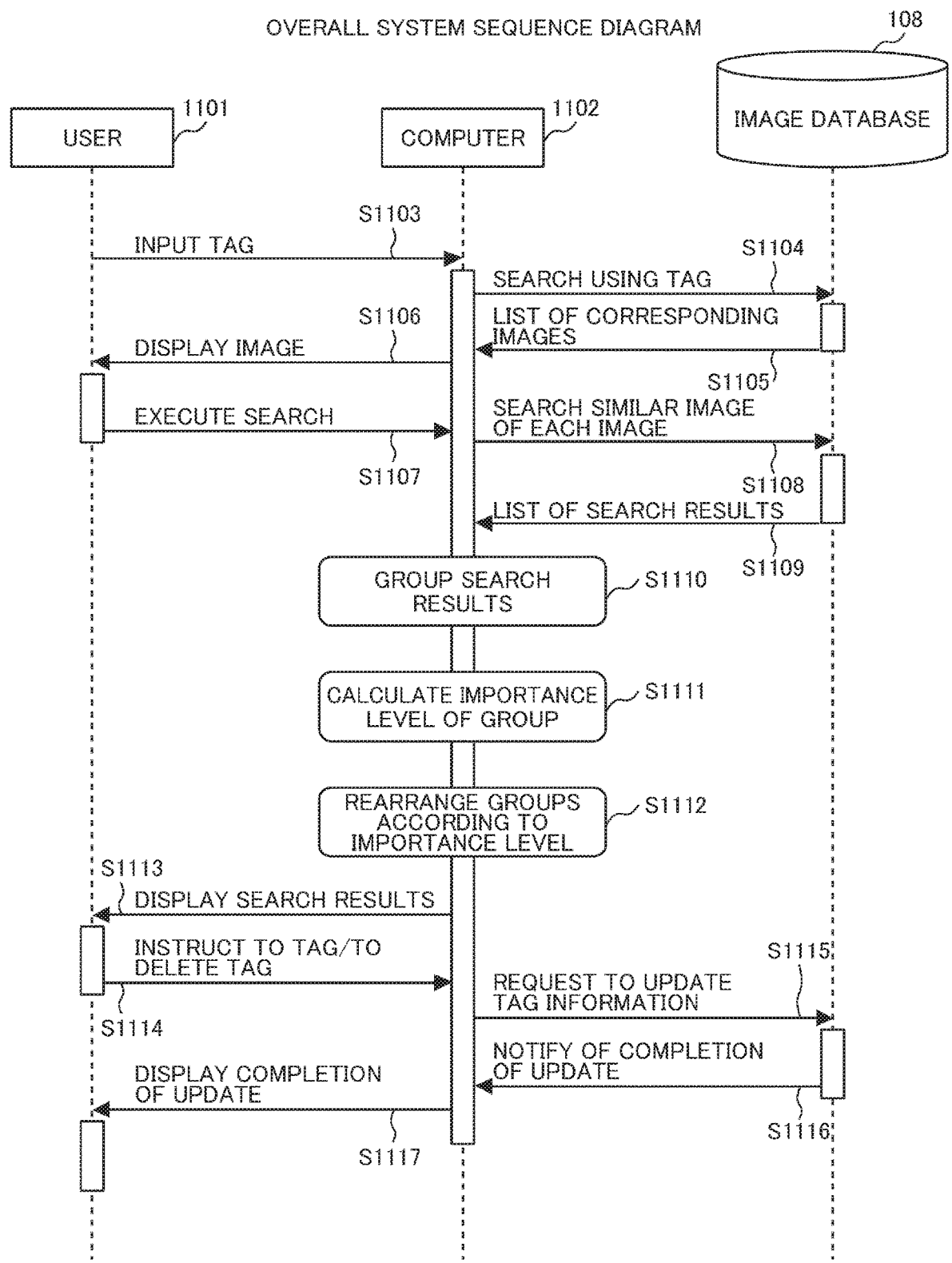
FIG. 11 Illustration for a processing sequence among each functional unit in processing for feeding back to a query group in the image tagging tool to which the image search device 105 is applied.

FIG. 11 explains a processing sequence of a user 1101, a computer 1102 and the image database 108 in a process in which the image search system 100 generates search results for each grouped query and feedbacks to the query. Each step shown in FIG. 11 will be described below.

[Query Generation Processing] (FIG. 11: Steps S1103 to S1106)

The user 1101 inputs a tag to the computer 1102 via the input device 102 (S1103). The computer 1102 instructs the search query generation unit 109 to transmit a request for obtaining images matched with the input tag to the image database 108 (S1104). The image database 108 searches images having the specified tag from registered images and returns feature values of the images as a result to the computer 1102 (S1105). The read images are called a query group in the following processing and are displayed for the user 1101 (S1106).

[Similar Image Search Processing] (FIG. 11: Steps S1107 to S1113)

The user 1101 makes a request for executing search processing to the computer 1102 using the displayed query (S1107). The computer 1102 transmits a request for the similar image search to the image database 108 using each image feature value obtained in the step S1105 for a query (S1108). The image database 108 searches an image close to the feature values by a predetermined number and returns the images to the computer 1102 (S1109). The computer groups search results according to the procedures shown in FIGS. 6 and 7 (S1110), calculates an importance level for each group (S1111), rearranges the groups according to the importance level (S1112), and returns a search result for each group to the user 1101 (S1113).

[Query Update Processing] (FIG. 11: Steps S1114 to S1117)

The user 1101 confirms the search result and makes a request for tagging similar images for each group or a request for deleting the tag of the query to the computer 1102 (S1114). The search result generation unit 113 transmits a request for updating the tag field to the image database 108 according to an instruction of the user (S1115). The image database 108 adds/deletes the tag to/from the specified image and returns notice that the update of the tag field is completed to the computer 1102 (S1116). The computer 1102 instructs to display the completion of a feedback to the query group for the user 1101 (S1117).

When the user 1101 newly starts the process from the step 1103, a search by the updated tag is enabled by the above-mentioned processing and a high-precision search result can be obtained.

As described above, the image search system equivalent to this embodiment has a characteristic that the image search system is provided with the storage unit 108 in which image feature values for a search extracted from an image to be searched are accumulated, the input unit 107 to which plural images are input as query images, the query generation unit 109 as an extraction unit that extracts image feature values from the query images, the search unit 110 that searches the image feature values for a search in the storage unit using the image feature values, the display device 103 that displays the original image from which the image feature values for a search similar to the image feature values are extracted as a search result and the determination unit 112 that determines an importance level of the query image on the basis of the search result.

As a similar image having a similar feature can be collectively confirmed for each group by the abovementioned characteristic, compared with a case where similar images in plural queries are collectively displayed, the quality of a search result is enhanced.

Second Embodiment

In the first embodiment, the method of enhancing the precision of the query by grouping multiple queries using the image search device 105 and updating tags in the image database 108 using search results for each group has been described. When the query grouping function of the image search device 105 according to the present invention is utilized, a common object included in input multiple images is precisely recognized and a useful analysis result for an input image group can be generated. In this embodiment, application to the video analysis of input continuous frames photographed by one or more cameras in predetermined time will be described.

Figure 12:
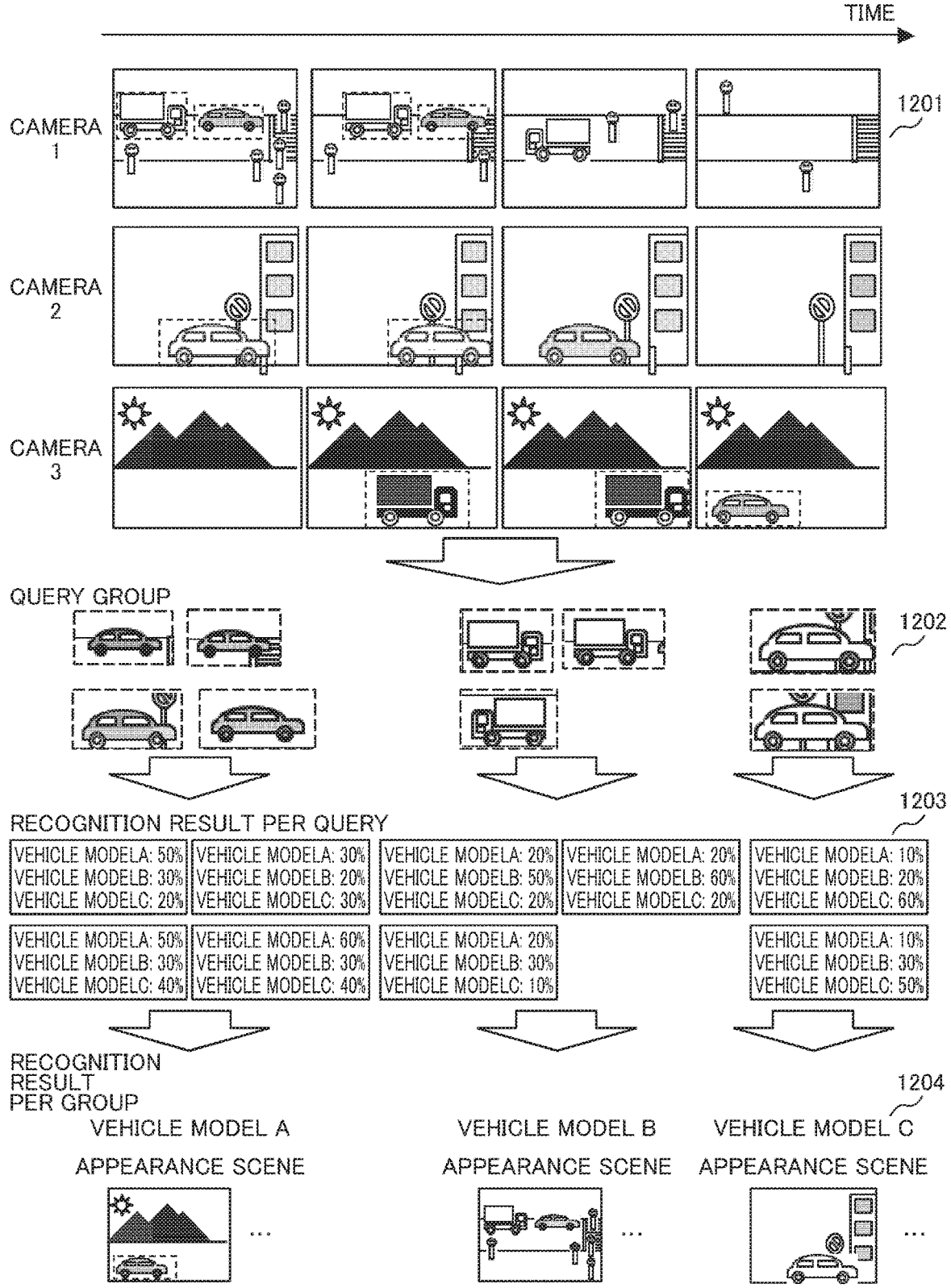
FIG. 12 Illustration for video analysis using an image search device 105.

FIG. 12 illustrates a process for analyzing a vehicle model in a camera video. It is continuous frames 1201 in predetermined time obtained from one or more cameras that are input to an image search device 105. Frames may also be extracted at a predetermined interval like one frame every other second. Or video is not obtained from a camera at real time but data stored in a dynamic file format may also be input to an image/video accumulation device 101. Information of vehicle models as images and tags of vehicles is registered in an image database 108 beforehand.

A search query generation unit 109 detects a partial area in which a vehicle is included from an input frame as a query object. For the extraction of a vehicle area from an image, well-known means is used. For example, a method of thoroughly checking a partial area in an image, moving a scanning window using a discrimination circuit dedicated to a vehicle and generated by machine learning is known.

Plural query objects obtained from each frame, vehicle images in this embodiment are used for queries and are grouped by the image search device 105 according to the present invention (1202). As for each vehicle image, a similar image which is a result of a search is first obtained by a similar image search. Further, a tag added to a query image used for a search key can be estimated by totaling information of tags added to the similar images. For an estimating method, when a tag of a vehicle model A is added to five similar images, a tag of a vehicle model B is added to three similar images and a tag of a vehicle model C is added to two similar images out of obtained ten similar images for example, a result of estimating a tag added to a query image such as a score like the vehicle model A is 50%, a score like the vehicle model B is 30% and a score like the vehicle model C is 20% can be output. In the calculation of scores, scores may also be weighted according to similarity and a frequency in the appearance of corresponding vehicles in the database.

As described above, an individual estimation result 1203 is obtained for each query. However, depending upon a scene, an effect of a background and cover is great and there is possibility that the precision of estimation is deteriorated.

Then, an effect of noise included in a query is reduced by integrating estimation results according to grouping and only a useful analysis result for a user can be displayed (1204). For a method of integrating estimation results, a simple mean value of individual estimation results may also be used and an estimation result having the greatest difference in a vehicle model between scores may also be adopted.

Figure 13:
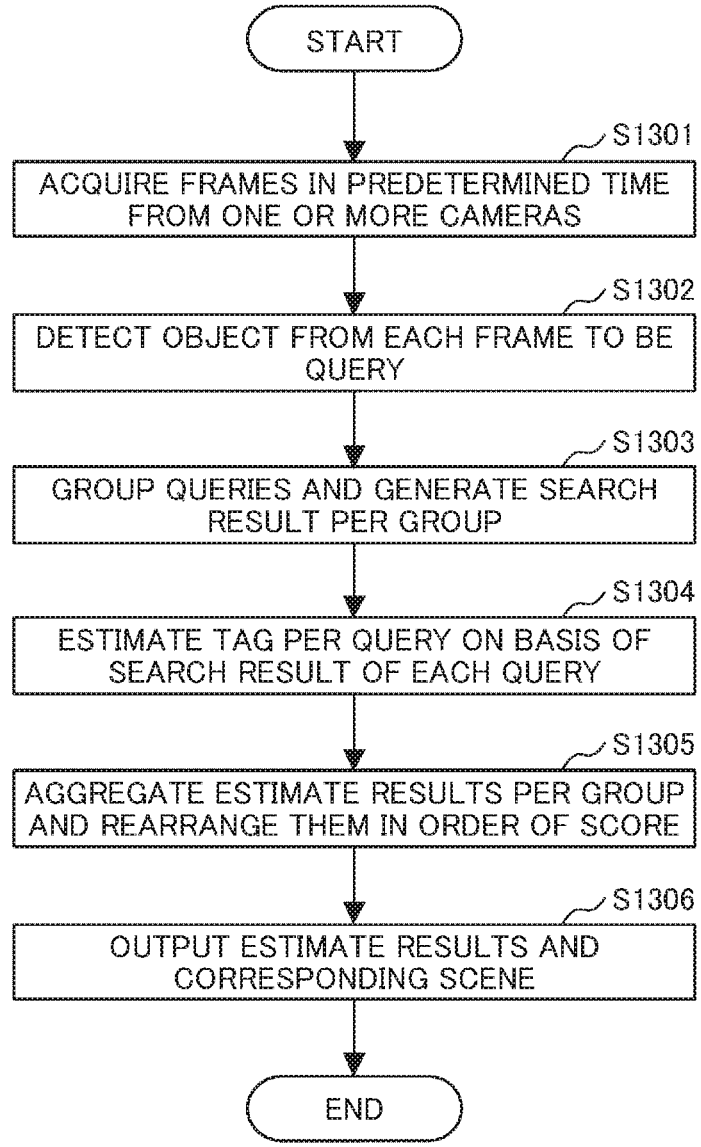
FIG. 13 A flowchart showing a procedure for video analysis using the image search device 105.

FIG. 13 is a flowchart for explaining a procedure for processing in which the image search device 105 makes video analysis using the grouping of queries. Each step in FIG. 13 will be described below.

(FIG. 13: Step S1301)

An image input unit 106 reads video data from the image/video accumulation device 101 and extracts frames at a predetermined interval. When one or more cameras are connected to an image search system 100, the image/video accumulation device 101 is made to function as a cache memory so as to enable inputting video data in predetermined time.

(FIG. 13: Step S1302)

The search query generation unit 109 detects a vehicle area from plural frames and extracts image feature values from an image in the detected area.

(FIG. 13: Step S1303)

The image search device 105 outputs grouped queries and search results using one or more queries generated in the step S1302. Although this processing is similar to S705 to S711 shown in FIG. 7, tag information of similar images is also appended to the search results.

(FIG. 13: Step S1304)

A search result generation unit 113 estimates a tag on the basis of the search result of each query and calculates a score for each tag. A method of estimating a tag is the same as that illustrated in FIG. 12.

(FIG. 13: Step S1305)

The search result generation unit 113 integrates individual tag estimation results for each group.

(FIG. 13: Step S1306)

A data output unit 114 outputs the integrated estimation result to an external device and terminates this process flow. The integrated estimation result may also be displayed on a display device 103 according to an application and may also be output to a data storage device 104. For example, when the integrated estimation result is output to a screen, the estimation result and its corresponding scene may also be displayed together.

Third Embodiment

As for the image search device 105 according to the present invention, the application to work for tagging the image has been described in the first embodiment and in the second embodiment, the application to an automatic estimation function of a tag has been described. In this embodiment, a method of realizing a more advanced similar image search will be described.

In the similar image search described in the abovementioned embodiments, an image similar to an input image in the whole features can be searched from the database. In the meantime, if a partially similar image can be found with focus on a partial area of an image, application to various applications is enabled. For example, in a figure trademark search/examination system, if it can be automatically detected that a part closely resembling a well-known figure trademark exists in a part of a figure to be examined, work for examination will be made efficient.

FIG. 14 illustrates a partial similar image search. To make a partial area of an image an object of a search, an element figure is extracted as a query object for an image stored in an image database 108 beforehand, and feature values and a pointer (image ID) to the image from which the element figure is extracted are stored for each element FIG. 1401). For a method of extracting the element figure, in the case of a figure configured by a figure drawing tool for example, information of figure components can be utilized and another arbitrary image data can be also dissolved into element figures by a well-known image recognition method.

In searching, when a compound figure like a query 1402 is given, element figures are extracted by the similar method and a similar image search is made using all the extracted element figures for queries. Element FIG. 1401 in the image database 108 are searched as an object. As a result, in a method similar to that in the first embodiment, the query is classified into plural groups (1403). For a method of calculating an importance level of the group, the number of similar element figures in the database may also be considered in addition to the number of queries. For example, in the case of FIG. 14, although multiple simple circular elements are included in the query, since they are familiar element figures also included in most figures in the database, the importance level of the group is decreased. A general view showing the original image from which similar element figures are extracted may also be displayed like 1404 shown in FIG. 14 as a search result.

A user can view a search result for each remarkable element by the abovementioned process and the quality of partial similar image search results can be enhanced.

Figure 15:
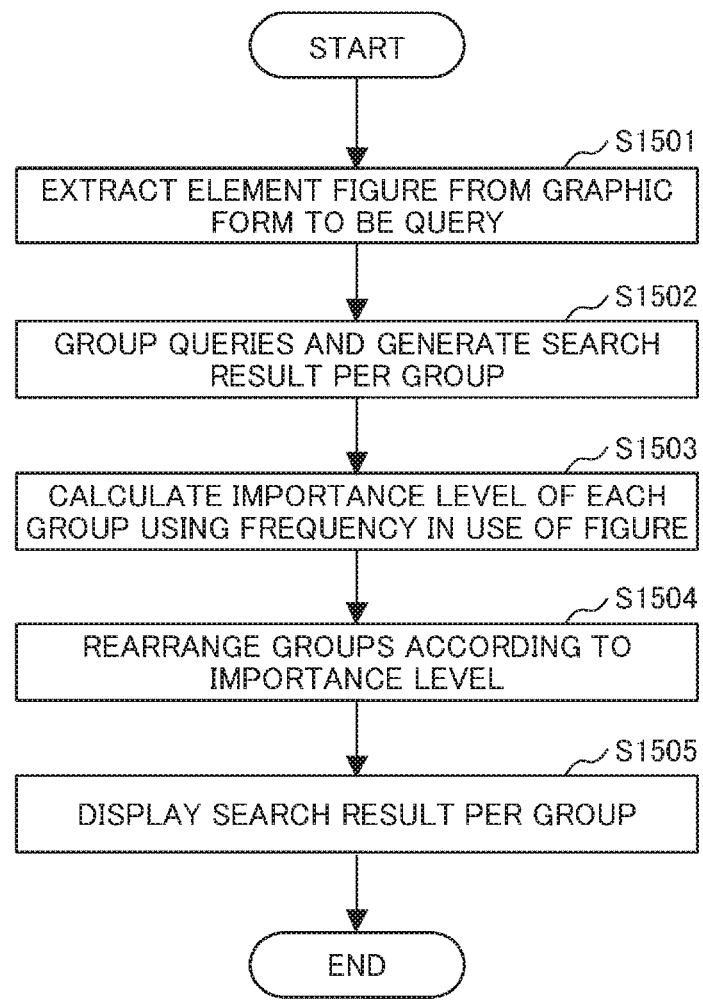
FIG. 15 A flowchart showing a procedure for the partial similar image search using the image search device 105.

FIG. 15 is a flowchart for explaining a procedure for processing in which the image search device 105 executes a partial similar image search using query grouping. Each step in FIG. 15 will be described below.

(FIG. 15: step S1501)

A search query generation unit 109 extracts element figures from a figure input from an image input unit 106 and calculates image feature values from each element figure so as to use them for a query.

(FIG. 15: Step S1502)

The image search device 105 outputs grouped queries and search results using one or more queries generated in the step S1502. This processing is similar to S705 to S711 shown in FIG. 7.

(FIG. 15: Step S1503)

A query group importance level determination unit 112 calculates an importance level on the basis of the number of queries included in the group and a frequency in the use of element figures in the database. The frequency in the use of element figures in the database is judged depending upon how many similar images having fixed or more similarity are found, for example.

(FIG. 15: Step S1504)

A search result generation unit 113 rearranges the groups on the basis of the importance level. Further, the search result generation unit 113 rearranges similar images in the group in the order of similarity. In this case, not the similar image itself but the original image from which element figures are extracted may also be used as a search result.

(FIG. 15: Step S1505)

A data output unit 114 outputs an estimation result to an external device and terminates this process flow. According to an application, the estimation result may also be displayed on a display device 103 and may also be output to a data storage device 104.

Fourth Embodiment

In a fourth embodiment of the present invention, an example of a configuration that an image search system 100 is built in a content cloud system will be described. An outline of the content cloud system will be first described and afterward, a method of building the image search system 100 in the content cloud system as an analysis module will be described. The configuration of the image search system 100 is similar to those in the first to third embodiments.

Figure 16:
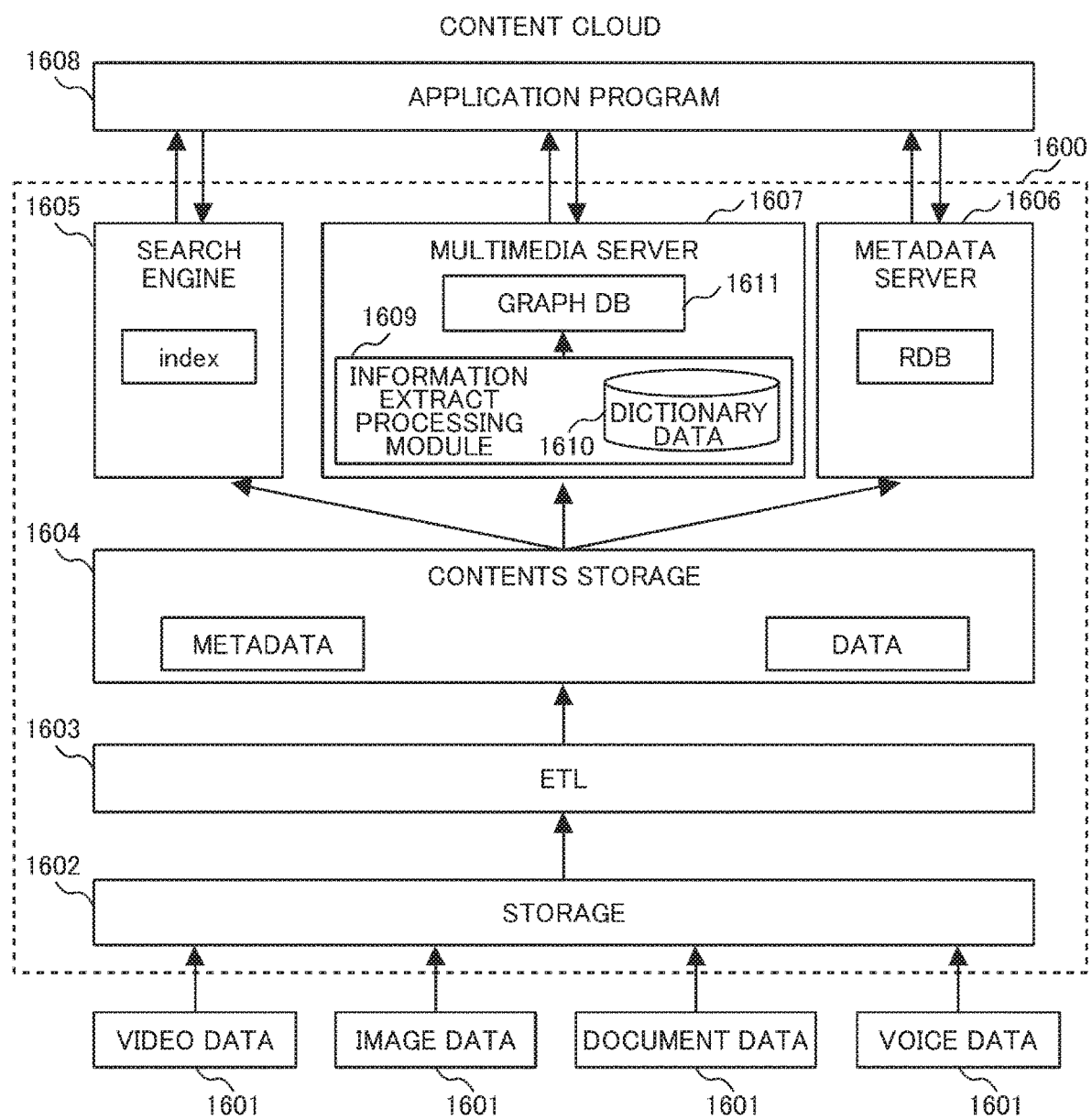
FIG. 16 A schematic diagram showing a content cloud system 1600 equivalent to a fourth embodiment.

FIG. 16 is a schematic diagram showing a content cloud system 1600 in this fourth embodiment. The content cloud system 1600 is provided with an Extract Transform Load (ETL) module 1603, a content storage 1604, a search engine 1605, a metadata server 1606 and a multimedia server 1607. The content cloud system is operated on a general computer provided with one or more CPUs, memories and storages and the system itself is configured by various modules. Further, respective modules are sometimes executed by an independent computer. In that case, each storage and the module are connected via a network and the like, and distributed processing in which data communication is made via them is realized.

An application program 1608 transmits a request to the content cloud system 1600 via the network and the like and the content cloud system 1600 transmits information according to the request to the application program 1608.

The content cloud system 1600 receives data in an arbitrary format 1601 such as video data, image data, document data and voice data as input. The data 1601 includes a figure trademark and its public relations documents, images in web sites and HTML documents, closed captioning and video data with voice, may also be structured data, and may also be unstructured data. Data input to the content cloud system 1600 is temporarily stored in a storage 1602.

The ETL 1603 monitors the storage 1602 and stores information (metadata) obtained from a file system in the content storage 1604 with the data archived when data 1601 is stored in the storage 1602.

The content storage 1604 stores information extracted by the ETL 1603 and data 1601 before processing temporarily stored in the storage 1602.

The search engine 1605 executes a text search on the basis of an index prepared by the ETL 1603 in the case of a text search for example in response to a request from the application program 1608 and transmits a search result to the application program 1608. As for algorithm of the search engine 1605, well-known technique can be applied. A module that searches not only a text but data such as an image and voice can be also mounted as the search engine 1605.

The metadata server 1606 manages metadata stored in an RDB (Relational Data Base). For example, suppose that a file name of data, a data registration date, a type of original data, metadata text information and the like respectively extracted by the ETL 1603 are registered in the RDB. When a request is made from the application program 1608, the metadata server 1606 transmits information in the RDB to the application program 1608 in response to the request.

The multimedia server 1607 operates an information extraction module 1609 in accordance with archived data in the content storage 1604 and extracts metadata related to contents of the data.

The information extraction module 1609 is configured by a text indexing module, an image recognition module and the like for example. For an example of metadata, time, an N-gram index, an image recognition result (an object name and area coordinates in an image), image feature values and their related terms and a voice recognition result are equivalent. As the information extraction module 1609 can use all programs for extracting any information (metadata) and can adopt well-known technique, the description of the information extraction module 1609 is omitted.

Metadata extracted from each media data is mutually correlated and is stored in graph DB 1611 structured in a graph format. For one example of correlation, for a voice recognition result of "apple" stored in the content storage 1604, the correspondence relation of an original voice file, image data and a related term can be represented in a network format. The multimedia server 1607 transmits meta-information according to a request from the application program to the application program 1608 when the request is made from the application program 1608. For example, when a request for "apple" is made, meta-information related on a network graph such as an image including an apple, an average rate and a name of a piece of music by an artist is provided on the basis of constructed graph structure.

In the abovementioned content cloud system 1600, the image search system 100 is utilized in two ways. First, a method of utilizing it as a module for generating dictionary data 1610 required for extracting information can be given. As in the first embodiment, only if work for tagging an image can be made efficient, the high-precision extraction of information is realized. Second, a method of utilizing the image search system for a function of the information extraction module 1609 itself can be given. As in the second embodiment, the image search system can be operated as the information extraction module by registering an estimated tag and its score in the graph DB when video data is input. When plural information extraction modules 1609 are built in the multimedia server 1607, resources of one computer may also be shared and an independent computer for each module may also be used.

Fourth Embodiment

Summary

As described above, the image search system 100 according to the present invention can be applied as a component of the content cloud system 1600. The content cloud system 1600 can integrate information among media by generating available metadata in common to each medium data. Hereby, it is expected that information having higher value added is provided to a user.

The present invention is not limited to the abovementioned embodiments and various variations are included. The abovementioned embodiments have been described in detail so as to clarify the present invention and the present invention is not necessarily limited to all the described configurations. Further, a part of the configuration in the certain embodiment can be also replaced with the configuration of another embodiment. Moreover, the configuration of another embodiment can be also added to the configuration of the certain embodiment. In addition, another configuration can be also added, deleted or replaced to/from/with a part of the configuration of each embodiment.

Each configuration, each function, each processing device and each processing unit respectively described above may also be realized by hardware by designing a part or the whole of them by an integrated circuit for example. Further, each configuration and each function respectively described above may also be realized by software by interpreting and executing a program in which a processor realizes respective functions. A program for realizing each function and information such as a table and a file can be stored in a recording device such as a memory, a hard disk and an SSD (Solid State Drive) and a record medium such as an IC card, an SD card and DVD.

REFERENCE SIGNS LIST

- 100: Image search system
- 101: Image/Video storage device
- 102: Input device
- 103: Display device
- 104: Data storage device
- 105: Image search device
- 106: Image input unit
- 107: User operation input unit
- 108: Image database
- 109: Search query generation unit
- 110: Similar image search unit
- 111: Query grouping unit
- 112: Query group importance level determination unit
- 113: Search result generation unit
- 114: Data output unit
- 1600: Content cloud system.

The invention claimed is:

1. An image search system, comprising:
a storage unit that stores image feature values extracted from images to be searched and a plurality of clusters of the images to be searched;
a processor coupled to a memory, the memory storing instructions that when executed by the processor, configure the processor to:
input a plurality of images as query images;
extract image feature values from each of the query images;
search the storage unit based on the feature values of the query images and return result images having feature values within a predetermined number of the feature values of the respective query images;
determine a closest cluster based on the extracted image feature values for each of the plurality of query images among the plurality of clusters of images to be searched, wherein a cluster is two or more image feature values determined to be relatively close to one another based on a respective calculated distance between the respective image feature values,
determine a mean vector of the image feature values of each cluster, and the closest cluster of each of the plurality of query images is determined based on a respective calculated distance between the mean vector of each cluster and the image feature value of the plurality of query images,
for each of the plurality of query images, determine a similarity value of each image within the closest cluster based on a distance between each feature value within the closest cluster and the feature value of the respective query image;
determine groups of query images such that each group includes query images having a same closest cluster and each group includes the result images of the query images within the respective group;
determine an importance value of each group based on a quantity of query images in each group; and
display as a search result, the groups ordered in descending order based on the respective determined importance values, wherein each group displayed as the search result includes and displays each of the similarity values of the images of the respective group ordered in descending order based on the similarity values;
wherein the storage unit stores respective objects which are extracted from a part of each of the images to be searched, the respective objects are objects to be searched,
wherein the processor is configured to:
extract a part of the query image as a query object and extracts the image feature values from the query object,
determine a first tag for one or more of the query images based on a second tag added to a plurality of the returned result images for each of the groups, and
add the determined first tag to the one or more query images and use the newly tagged one or more query images in a subsequent search.

2. An image search method, comprising:
storing image feature values extracted from images to be searched and a plurality of clusters of the images to be searched;
inputting a plurality of images as query images;
extracting image feature values from the query images;
searching the stored image feature values to return result images having feature values within a predetermined number of the feature values of the respective query images;
determining a closest cluster based on the extracted image feature values for each of the plurality of query images among the plurality of clusters of images to be searched, wherein a cluster is two or more image feature values determined to be relatively close to one another based on a respective calculated distance between the respective image feature values,
determining a mean vector of the image feature values of each cluster, and the closest cluster of each of the plurality of query images is determined based on a respective calculated distance between the mean vector of each cluster and the image feature value of the plurality of query images, for each of the plurality of query images, determining a similarity value of each image within the closest cluster based on a distance between each feature value within the closest cluster and the feature value of the respective query image;

determining groups of query images such that each group includes query images having a same closest cluster and each group includes the result images of the query images within the respective group;

determining an importance value of each group based on a quantity of query images in each group; and displaying, as a search result, the groups ordered in descending order based on the respective determined importance values, wherein each group displayed as the search result includes and displays each of the similarity values of the images of the respective group ordered in descending order based on the similarity values;

determining a first tag for one or more of the query images based on a second tag added to a plurality of the returned result images for each of the groups;

adding the determined first tag to the one or more query images and use the newly tagged one or more query images in a subsequent search; and storing respective objects which are extracted from a part of each of the images to be searched, the respective objects are objects to be searched, wherein a part of the query image is extracted as a query object and the image feature values are extracted from the query object.

3. A non-transitory information recording medium in which there is recorded a program for instructing a computer to execute:

storing image feature values extracted from images to be searched and a plurality of clusters of the images to be searched;

inputting a plurality of images as query images;

extracting image feature values from the query images;

searching the stored image feature values to return result images having feature values within a predetermined number of the feature values of the respective query images;

determining a closest cluster based on the extracted image feature values for each of the plurality of query images among the plurality of clusters of images to be searched, wherein a cluster is two or more image feature values determined to be relatively close to one another based on a respective calculated distance between the respective image feature values, determining a mean vector of the image feature values of each cluster, and the closest cluster of each of the plurality of query images is determined based on a respective calculated distance between the mean vector of each cluster and the image feature value of the plurality of query images, for each of the plurality of query images, determining a similarity value of each image within the closest cluster based on a distance between each feature value within the closest cluster and the feature value of the respective query image;

determining groups of query images such that each group includes query images having a same closest cluster and each group includes the result images of the query images within the respective group;

determining an importance value of each group based on a quantity of query images in each group; and displaying as a search result, the groups ordered in descending order based on the respective determined importance values, wherein each group displayed as the search result includes and displays each of the similarity values of the images of the respective group ordered in descending order based on the similarity values;

determining a first tag for one or more of the query images based on a second tag added to a plurality of the returned result images for each of the groups;

adding the determined first tag to the one or more query images and use the newly tagged one or more query images in a subsequent search; and storing respective objects which are extracted from a part of each of the images to be searched, the respective objects are objects to be searched, wherein a part of the query image is extracted as a query object and image feature values are extracted from the query object.

* * * * *